US012572962B2

(12) United States Patent
Shimomura et al.

(10) Patent No.: US 12,572,962 B2
(45) Date of Patent: Mar. 10, 2026

(54) CUSTOMER SERVING ASSISTANCE APPARATUS, CUSTOMER SERVING ASSISTANCE METHOD, AND NON-TRANSITORY COMPUTER-READABLE STORAGE MEDIUM

(71) Applicant: NEC Corporation, Tokyo (JP)

(72) Inventors: Hanae Shimomura, Tokyo (JP); Emiko Ishii, Tokyo (JP); Mamiko Fumoto, Tokyo (JP); Akane Yamazaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 76 days.

(21) Appl. No.: 18/273,871

(22) PCT Filed: Apr. 16, 2021

(86) PCT No.: PCT/JP2021/015686
§ 371 (c)(1),
(2) Date: Jul. 24, 2023

(87) PCT Pub. No.: WO2022/219798
PCT Pub. Date: Oct. 20, 2022

(65) Prior Publication Data
US 2024/0428297 A1 Dec. 26, 2024

(51) Int. Cl.
*G06Q 30/00* (2023.01)
*G06Q 30/015* (2023.01)
*G06Q 30/02* (2023.01)

(52) U.S. Cl.
CPC ....... *G06Q 30/0281* (2013.01); *G06Q 30/015* (2023.01)

(58) Field of Classification Search
None
See application file for complete search history.

(56) References Cited

U.S. PATENT DOCUMENTS

2003/0046106 A1* 3/2003 Tsunoda ................. G06Q 30/02
705/1.1
2006/0002413 A1* 1/2006 Tsutazawa ............. G06Q 50/12
370/229
(Continued)

FOREIGN PATENT DOCUMENTS

JP 2004-302886 A 10/2004
JP 2006228156 A * 8/2006
(Continued)

OTHER PUBLICATIONS

Evolution or retail formats: Past, present, and future, Gauri, et al.; Journal or Retailing 97 (Jan. 2021) 42-61 (Year: 2021).*
(Continued)

*Primary Examiner* — Matthew T Sittner
(74) *Attorney, Agent, or Firm* — Sughrue Mion, PLLC

(57) ABSTRACT
A customer serving assistance apparatus (20) includes a first acquisition unit (210) and an output unit (220). The first acquisition unit (210) acquires customer determination information and customer serving desire information from a store terminal (10). An example of the customer determination information is a face image of a customer, or customer identification information. The customer serving desire information indicates whether customer serving by a clerk is desired. The output unit (220) determines, in regard to at least customer serving desire information indicating that customer serving is desired, customer determination information related to the customer serving desire information, and determines a face image of a customer related to the customer determination information. Then, the output unit (220) outputs output data including the determined face image. An example of an output destination of the output data is a clerk terminal (30).

15 Claims, 22 Drawing Sheets

(56)  References Cited

U.S. PATENT DOCUMENTS

| | | | | |
|---|---|---|---|---|
| 2015/0127485 A1* | 5/2015 | Kakizawa | .......... | G06Q 30/0613 |
| | | | | 705/26.41 |
| 2017/0278162 A1* | 9/2017 | Yamaura | .............. | G06V 40/174 |
| 2017/0337602 A1 | 11/2017 | Davis | | |
| 2018/0268475 A1 | 9/2018 | Ziskin | | |

FOREIGN PATENT DOCUMENTS

| | | | | | | |
|---|---|---|---|---|---|---|
| JP | 2007-188118 | A | | 7/2007 | | |
| JP | 2007-241786 | A | | 9/2007 | | |
| JP | 2008059575 | A | * | 3/2008 | | |
| JP | 2015090654 | A | * | 5/2015 | ......... | G06Q 30/0613 |
| JP | 2017174272 | A | * | 9/2017 | .......... | G06V 40/174 |
| JP | 2018045430 | A | * | 3/2018 | | |
| JP | 2019185714 | A | * | 10/2019 | | |
| WO | 03/083744 | A1 | | 10/2003 | | |

OTHER PUBLICATIONS

JP Office Action for JP Application No. 2023-514292, mailed on Dec. 3, 2024 with English Translation.
International Search Report for PCT Application No. PCT/JP2021/015686, mailed on Jul. 6, 2021.

* cited by examiner

| CUSTOMER DETERMINATION INFORMATION (FACE IMAGE) | CUSTOMER SERVING DESIRE INFORMATION |
|---|---|
| . . . | NECESSARY |
| . . . | UNNECESSARY |
| ⋮ | ⋮ |

| CUSTOMER DETERMINATION INFORMATION (FACE IMAGE) | CUSTOMER SERVING DESIRE INFORMATION | CLERK-IN-CHARGE INFORMATION (CLERK IN CHARGE OF CUSTOMER SERVING) |
|---|---|---|
| ... | NECESSARY | CLERK A |
| ... | UNNECESSARY | — |
| ... | NECESSARY | UNDETERMINED |
| ⋮ | ⋮ | ⋮ |

| CUSTOMER DETERMINATION INFORMATION (FACE IMAGE) | CUSTOMER SERVING DESIRE INFORMATION | CLERK-IN-CHARGE INFORMATION (CLERK IN CHARGE OF CUSTOMER SERVING) | VISIT TIME |
|---|---|---|---|
| · · · | NECESSARY | CLERK A | 9:40 |
| · × × | UNNECESSARY | — | 9:55 |
| · · · | NECESSARY | UNDETERMINED | 9:58 |
| · · · | NECESSARY | UNDETERMINED | 10:15 |
| ⋮ | ⋮ | ⋮ | |

| CUSTOMER IDENTIFICATION INFORMATION | FACE IMAGE | DETAILED INFORMATION | |
|---|---|---|---|
| | | GENDER | PURCHASE INFORMATION |
| 001 | · · · | MALE | · · · |
| 002 | · · · | FEMALE | · · · |
| 003 | · · · | MALE | · · · |
| ⋮ | ⋮ | ⋮ | ⋮ |

| CUSTOMER DETERMINATION INFORMATION (FACE IMAGE) | CUSTOMER SERVING DESIRE INFORMATION | CLERK-IN-CHARGE INFORMATION (CLERK IN CHARGE OF CUSTOMER SERVING) | VISIT TIME (EXIT INFORMATION) | PRESENT POSITION |
|---|---|---|---|---|
| ... | NECESSARY | CLERK A | ALREADY EXITED | — |
| ... | UNNECESSARY | — | 9:55 | ... |
| ... | NECESSARY | UNDETERMINED | 9:58 | ... |
| ... | NECESSARY | UNDETERMINED | 10:15 | ... |
| --- | --- | --- | --- | --- |

CUSTOMER SERVING ASSISTANCE APPARATUS, CUSTOMER SERVING ASSISTANCE METHOD, AND NON-TRANSITORY COMPUTER-READABLE STORAGE MEDIUM

This application is a National Stage Entry of PCT/JP2021/015686 filed on Apr. 16, 2021, the contents of all of which are incorporated herein by reference, in their entirety.

TECHNICAL FIELD

The present invention relates to a customer serving assistance apparatus, a customer serving assistance method, and a program.

BACKGROUND ART

When a customer enters a store, in many cases, a clerk of the store attends to the customer. Patent Document 1 discloses that VIP customer's coming to a store is detected by reading an IC tag of the customer, and then information relating to the VIP customer is displayed by being correlated to a face image of the customer. Patent Document 2 discloses that the state of mind of a customer is guessed, and a customer serving order and a customer position are output in accordance with the state of mind. Patent Document 3 discloses that a customer not desiring to be served carries a card, that if a card reader/writer detects the card, an output to this effect is delivered to a terminal, and that the terminal notifies a clerk of the customer not desiring to be served, by an alarm or the like.

RELATED DOCUMENTS

Patent Documents

Patent Document 1: Japanese Patent Application Publication No. 2019-185714
Patent Document 2: Japanese Patent Application Publication No. 2017-174272
Patent Document 3: Japanese Patent Application Publication No. 2007-188118

SUMMARY OF INVENTION

Technical Problem

Depending on customers, in many cases, serving by a clerk is not desired. An example of the object of the present invention is to enable a clerk to easily identify a customer desiring to be served.

Solution to Problem

According to the present invention, there is provided a customer serving assistance apparatus including:

a first acquisition unit that acquires customer determination information that determines a customer entering a store, and customer serving desire information indicating whether the customer desires to be served; and an output unit that determines, in regard to at least the customer serving desire information indicating that customer serving is desired, the customer determination information related to the customer serving desire information, determining a face image of the customer related to the customer determination information, and outputting output data including the face image.

According to the present invention, there is provided a customer serving assistance method in which a computer executes:

a first acquisition process of acquiring customer determination information that determines a customer entering a store, and customer serving desire information indicating whether the customer desires to be served; and an output process of determining, in regard to at least the customer serving desire information indicating that customer serving is desired, the customer determination information related to the customer serving desire information, determining a face image of the customer related to the customer determination information, and outputting output data including the face image.

According to the present invention, there is provided a program causing a computer to include:

a first acquisition function of acquiring customer determination information that determines a customer entering a store, and customer serving desire information indicating whether the customer desires to be served; and an output function of determining, in regard to at least the customer serving desire information indicating that customer serving is desired, the customer determination information related to the customer serving desire information, determining a face image of the customer related to the customer determination information, and outputting output data including the face image.

ADVANTAGEOUS EFFECTS OF INVENTION

According to the present invention, a clerk can easily identify a customer desiring to be served.

BRIEF DESCRIPTION OF THE DRAWINGS

The above-described object, other objects, features and advantageous effects will become clearer by preferred example embodiments to be described below, and the following accompanying drawings.

FIG. 4 It is a diagram illustrating a first example of information that an information storage unit stores.

FIG. 5 It is a diagram illustrating a second example of the information that the information storage unit stores.

FIG. 12 It is a diagram illustrating an example of information that an information storage unit stores in a second example embodiment.

FIG. 14 It is a view illustrating an example of a screen displayed on a display after step S130.

FIG. 16 It is a diagram illustrating an example of information that a customer information storage unit stores.

FIG. 20 It is a diagram illustrating an example of information that an information storage unit stores in the fourth example embodiment.

EXAMPLE EMBODIMENT

Hereinafter, example embodiments of the present invention are described with reference to the drawings. Note that, in all drawings, a similar structural element is denoted by a similar reference sign, and a description thereof is not included as appropriate.

First Example Embodiment

Figure 1:
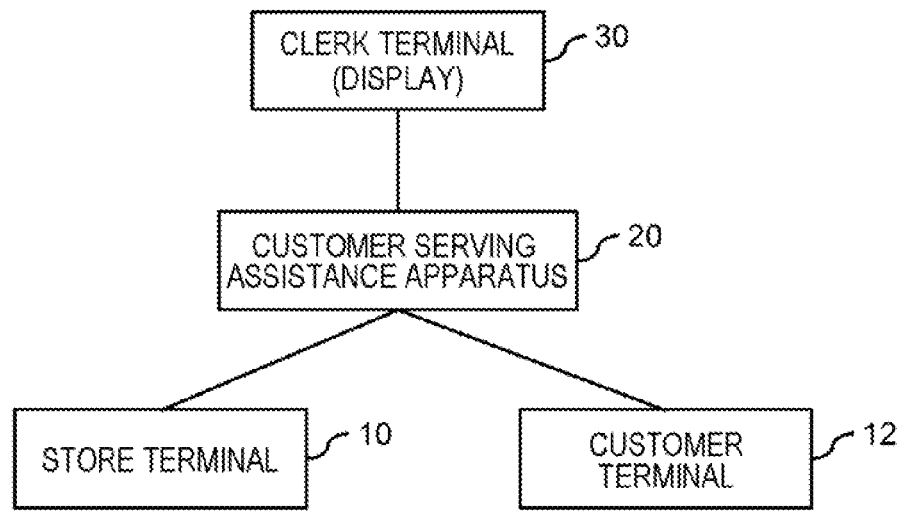
FIG. 1 It is a diagram for describing an environment of use of a customer serving assistance apparatus according to a first example embodiment of the present invention.

FIG. 1 is a diagram for describing an environment of use of a customer serving assistance apparatus 20 according to the present example embodiment. The customer serving assistance apparatus 20 is used together with at least one of a store terminal 10 and a customer terminal 12, and together with a clerk terminal 30. The customer serving assistance apparatus 20 executes a process for causing a clerk to recognize information (hereinafter referred to as "customer serving desire information") indicating whether a customer entering a store desires to be served by the clerk.

The store terminal 10 and the customer terminal 12 are operated by the customer entering the store. The store terminal 10 is installed in the store or at an entrance of the store. The customer terminal 12 is a portable terminal that the customer carries, and includes a communication function. The customer terminal 12 is, for example, a smartphone or a tablet terminal, but is not limited to these. Hereinafter, when at least one of the store terminal 10 and the customer terminal 12 is designated, this is described as "store terminal 10".

The clerk terminal 30 is a terminal that a clerk operates. The clerk terminal 30 may be a portable terminal or a stationary terminal. The clerk terminal 30 includes at least a display.

A customer inputs to the store terminal 10 information (hereinafter referred to as "customer serving desire information") indicating whether the customer desires to be served by a clerk. In addition, the store terminal 10 acquires information (hereinafter referred to as "customer determination information") that determines the customer. One example of the customer determination information is a face image of the customer, but may be customer identification information uniquely allocated to the customer (for example, a membership ID used in the store or management body (e.g., a company)). For example, when the store terminal 10 includes an imaging unit, the store terminal 10 generates a face image of a customer that inputs customer serving desire information, as customer determination information. Then, the store terminal 10 transmits the customer serving desire information associated with face image to the customer serving assistance apparatus 20. Note that when the customer terminal 12 executes this process, the timing when this process is executed may be before the coming to the store, or may be in the store, aside from at the entrance of the store.

Upon acquiring the customer serving desire information and face image, the customer serving assistance apparatus 20 transmits the customer serving desire information and face image to the clerk terminal 30. The clerk terminal 30 displays the received customer serving desire information and face image on the display. By recognizing the information displayed on the display, the clerk can recognize the face image of the customer desiring to be served.

By operating the clerk terminal 30, the clerk selects the customer that is to be served by the clerk. The clerk terminal 30 transmits the customer determination information of the selected customer to the customer serving assistance apparatus 20 as at least part of information (hereinafter referred to as "select information") indicating that the customer is selected by the clerk. The customer serving assistance apparatus 20 manages the customer determination information received from the clerk terminal 30. Thereby, the customer serving assistance apparatus 20 can manage a customer, for which a clerk in charge of customer serving is not determined.

Note that there is a case where in a storage unit not illustrated, a face image of a customer is associated with customer identification information. In this case, by the input from the customer, the store terminal 10 may acquire the customer identification information as the customer determination information, and may transmit the customer identification information, in place of the face image, to the customer serving assistance apparatus 20. Then, the customer serving assistance apparatus 20 reads out the face image, which is associated with the acquired customer identification information, from the storage unit, and transmits the face image associates with customer serving information to the clerk terminal 30.

Figure 2:
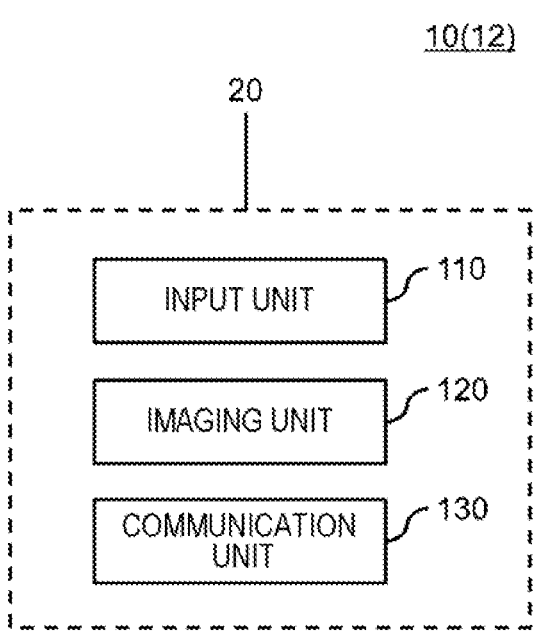
FIG. 2 It is a diagram illustrating an example of a functional configuration of a store terminal 10.

FIG. 2 is a diagram illustrating an example of a functional configuration of the store terminal 10. The store terminal 10 includes an input unit 110, an imaging unit 120, and a communication unit 130.

Information is input from the customer to the input unit 110. An example of the information to be input is the above-described customer serving desire information and the customer identification information. In a case where the store terminal 10 includes a touch panel, the input unit 110 acquires information via the touch panel. In addition, in a case where the input unit 110 includes an input device such as a keyboard, the input unit 110 acquires information via the input device. Besides, the input unit 110 may acquire information from the customer terminal 12 via wireless communication.

The imaging unit 120 generates a face image of a customer while the customer is inputting information to the input unit 110.

The communication unit 130 transmits the information acquired by the input unit 110 and the face image generated by the imaging unit 120 to the customer serving assistance apparatus 20.

Note that an example of a functional configuration of the customer terminal 12 is similar to the example of the functional configuration of the store terminal 10 illustrated in FIG. 2.

Figure 3:
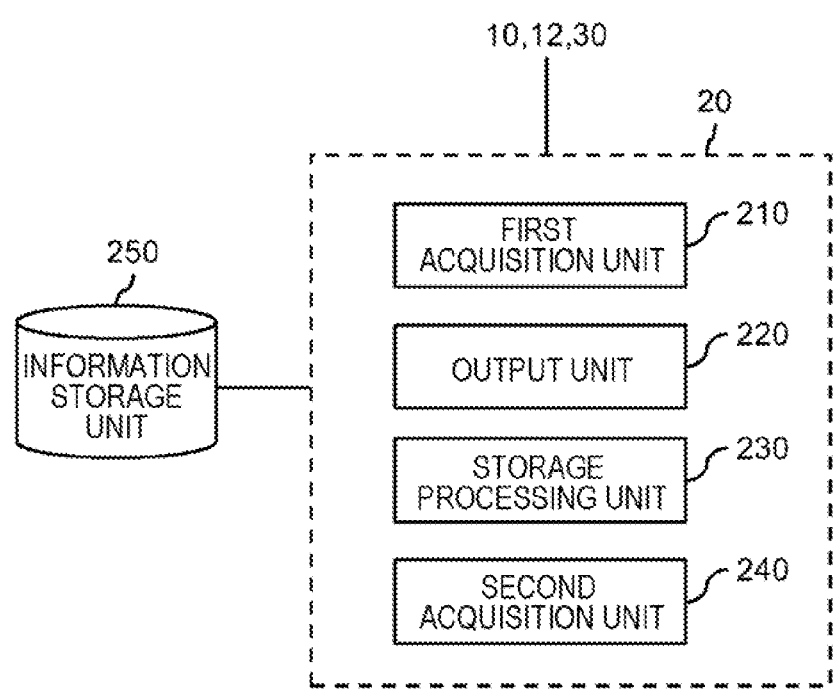
FIG. 3 It is a diagram illustrating an example of a functional configuration of a customer serving assistance apparatus.

FIG. 3 is a diagram illustrating an example of a functional configuration of the customer serving assistance apparatus 20. The customer serving assistance apparatus 20 includes a first acquisition unit 210, an output unit 220, a storage processing unit 230, and a second acquisition unit 240.

The first acquisition unit 210 acquires customer determination information and customer serving desire information from the store terminal 10. As described above, an example of the customer determination information is a face image of a customer, or customer identification information.

In regard to at least the customer serving desire information indicating that customer serving is desired, the output unit 220 determines the customer determination information related to the customer serving desire information, and determines the face image of the customer related to the customer determination information. Then, the output unit 220 outputs output data including the determined face image. An example of an output destination of the output data is the clerk terminal 30.

Note that, regardless of whether customer serving is desired or not, the output unit 220 may include the customer serving desire information and the face image into the output data. In this case, the output unit 220 includes, in the output data, customer serving desire information indicating that customer serving is desired, and the face image related to this customer serving desire information, and customer serving desire information indicating that customer serving is not desired, and the face image related to this customer serving desire information.

The storage processing unit 230 causes an information storage unit 250 to store the customer determination information and the customer serving desire information acquired by the first acquisition unit 210 associated with each other. Thus, by referring to the information storage unit 250, the customer serving assistance apparatus 20 can manage customer serving desire information of each of customers visiting the store.

Note that as described with reference to FIG. 1, the clerk terminal 30 displays the output data, which was output by the output unit 220, on the display. Then, a clerk selects a customer that is to be served by the clerk. The clerk terminal 30 transmits the customer determination information of the customer selected by the clerk to the customer serving assistance apparatus 20 as at least part of the select information (indicating that the customer was selected by the clerk). Note that the clerk terminal 30 may transmit information (hereinafter referred to as "clerk identification information") indicating the clerk, together with the select information, to the customer serving assistance apparatus 20. The clerk identification information is, for example, a clerk ID.

The second acquisition unit 240 acquires the select information that the clerk terminal 30 transmitted. Then, the storage processing unit 230 causes the information storage unit 250 to store information (hereinafter referred to as "clerk-in-charge information") indicating that a clerk in charge of a customer was determined associated with the customer determination information included in the select information. Thus, the clerk can recognize a customer for which a clerk in charge of the customer has not been determined, by causing the clerk terminal 30 to display the information stored in the information storage unit 250 via the customer serving assistance apparatus 20.

In addition, when the clerk terminal 30 also transmitted clerk identification information, the second acquisition unit 240 also acquires the clerk identification information. Then, the storage processing unit 230 causes the information storage unit 250 to also store the clerk identification information as part of the clerk-in-charge information. In this case, an administrator of the customer serving assistance apparatus 20 can confirm clerks performing customer serving on a customer-by-customer basis, by confirming the clerk-in-charge information stored in the information storage unit 250.

Note that when an identical customer visited an identical store twice or more, the information storage unit 250 may store a history of clerk-in-charge information. In a case where the clerk-in-charge information includes clerk identification information, the history indicates a clerk that attended to the customer in the past. Thus, by causing the clerk terminal 30 to display the information stored in the information storage unit 250, a clerk can confirm a customer that the clerk attended to in the past.

Note that the information storage unit 250 may be a part of the customer serving assistance apparatus 20, or may be disposed outside the customer serving assistance apparatus 20.

FIG. 4 illustrates a first example of information that the information storage unit 250 stores. In the example illustrated in this Figure, the information storage unit 250 stores customer determination information (for example, face image) and customer serving desire information on a customer-by-customer basis associated with each other.

FIG. 5 illustrates a second example of information that the information storage unit 250 stores. In the example illustrated in this Figure, like the example illustrated in FIG. 4, the information storage unit 250 stores the customer determination information (for example, face image) and the customer serving desire information associated with each other. Furthermore, the information storage unit 250 stores clerk identification information of a clerk in charge of customer serving, as clerk-in-charge information, in regard to a customer desiring to be served, for whom a clerk in charge of customer serving is determined.

Figure 6:
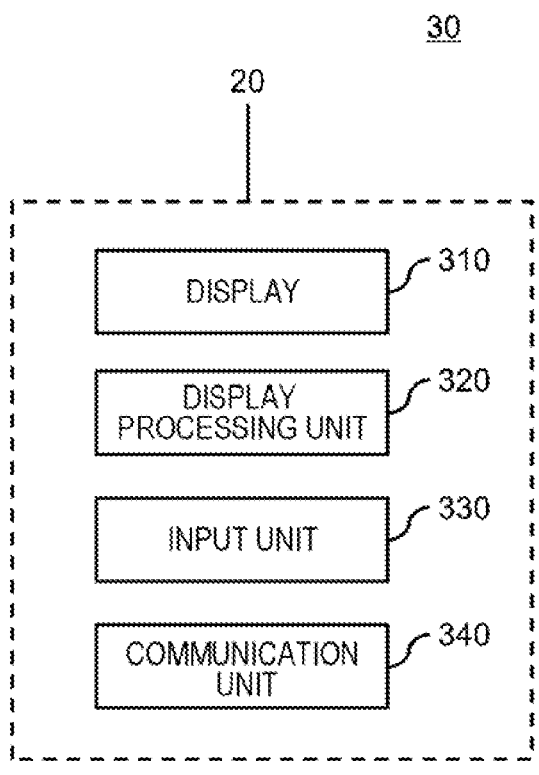
FIG. 6 It is a diagram illustrating an example of a functional configuration of a clerk terminal.

FIG. 6 is a diagram illustrating an example of a functional configuration of the clerk terminal 30. The clerk terminal 30 includes a display 310, a display processing unit 320, an input unit 330, and a communication unit 340.

The display processing unit 320 causes the display 310 to display the information received from the customer serving assistance apparatus 20.

Information is input from a clerk to the input unit 330. An example of the input information is the above-described select information. In a case where the display 310 is a touch panel, the input unit 330 acquires predetermined information via the display 310.

The communication unit 340 transmits the select information, which is input to the input unit 330, to the customer serving assistance apparatus 20. The communication unit 340 stores clerk identification information of a clerk that possesses the clerk terminal 30 in advance. When necessary, the communication unit 340 transmits the clerk identification information to the customer serving assistance apparatus 20.

Figure 7:
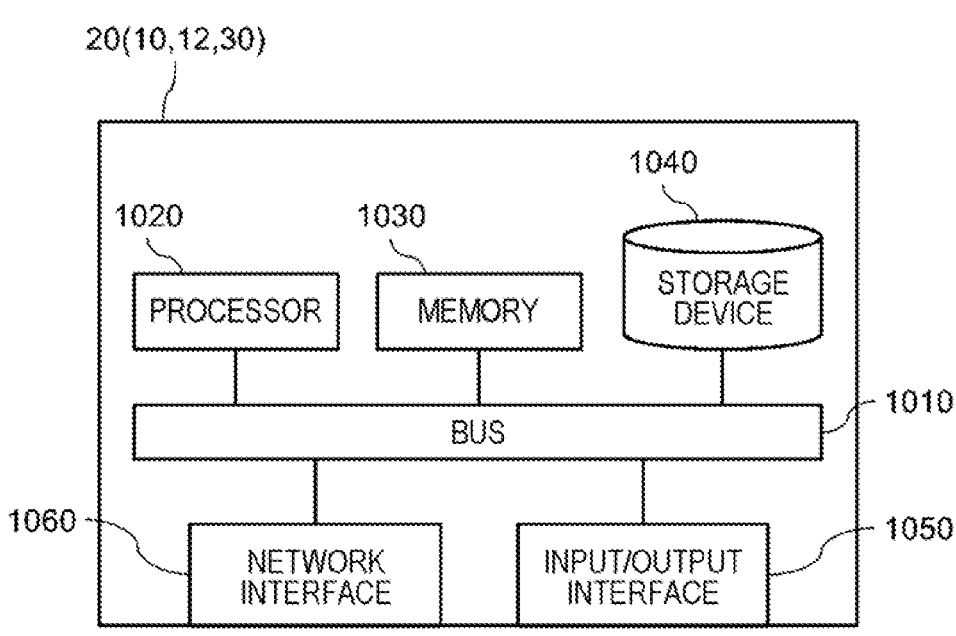
FIG. 7 It is a diagram illustrating a hardware configuration example of the customer serving assistance apparatus.

FIG. 7 is a diagram illustrating a hardware configuration example of the customer serving assistance apparatus 20. The customer serving assistance apparatus 20 includes a bus 1010, a processor 1020, a memory 1030, a storage device 1040, an input/output interface 1050, and a network interface 1060.

The bus 1010 is a data transmission path for the processor 1020, memory 1030, storage device 1040, input/output interface 1050 and network interface 1060 to transmit and receive data to and from each other. However, a method of mutually connecting the processor 1020 and so forth is not limited to the bus connection.

The processor 1020 is a processor implemented by a central processing unit (CPU), a graphics processing unit (GPU), or the like.

The memory 1030 is a main storage apparatus implemented by a random access memory (RAM) or the like.

The storage device 1040 is an auxiliary storage apparatus implemented by a hard disk drive (HDD), a solid state drive (SSD), a memory card, a read only memory (ROM), or the like. The storage device 1040 stores program modules that implement the functions of the customer serving assistance apparatus 20 (for example, the first acquisition unit 210, output unit 220, storage processing unit 230 and second acquisition unit 240, and a first image processing unit 270 and a second image processing unit 280 described in other example embodiments to be described later). The processor 1020 reads these program modules onto the memory 1030 and executes the program modules, thereby implementing the functions related to the program modules. In addition, the storage device 1040 also functions as the information storage unit 250, and a customer information storage unit 260 described in other example embodiments to be described later.

The input/output interface 1050 is an interface for connecting the customer serving assistance apparatus 20 and various input/output equipment.

The network interface 1060 is an interface for connecting the customer serving assistance apparatus 20 to a network. The network is, for example, a local area network (LAN), or a wide area network (WAN). A method of connection of the network interface 1060 to the network may be wireless connection or wired connection. The customer serving assistance apparatus 20 may communicate with the store terminal 10 and the clerk terminal 30 via the network interface 1060.

Note that hardware configuration examples of the store terminal 10 and the clerk terminal 30 are also as illustrated in FIG. 7.

Figure 8:
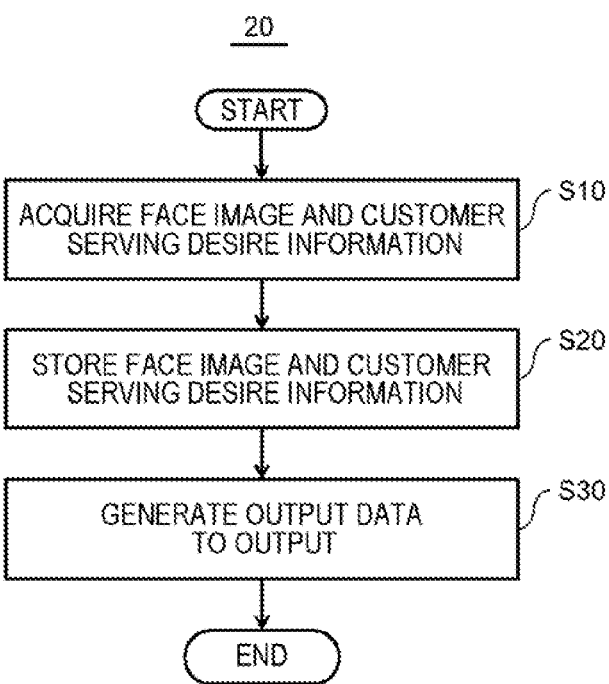
FIG. 8 It is a flowchart illustrating a first example of a process that the customer serving assistance apparatus executes.

FIG. 8 is a flowchart illustrating a first example of a process that the customer serving assistance apparatus 20 executes. To begin with, a customer inputs customer serving desire information to the store terminal 10. At this time, the store terminal 10 generates a face image of the customer as customer determination information. Then, the store terminal 10 transmits the customer serving desire information and the face image to the customer serving assistance apparatus 20.

The first acquisition unit 210 of the customer serving assistance apparatus 20 acquires the customer serving desire information and the face image from the store terminal 10 (step S10). Then, the storage processing unit 230 causes the information storage unit 250 to store the customer serving desire information and the face image (step S20).

Next, the output unit 220 reads out the customer serving desire information and the face image from the information storage unit 250. Here, the output unit 220 may read out all customer serving desire information and face images that the information storage unit 250 stores, or may read out customer serving desire information and a face image newly stored in the information storage unit 250. In the case of the latter, the output unit 220 may acquire the customer serving desire information and face image from the first acquisition unit 210, instead of reading out the customer serving desire information and face image from the information storage unit 250. Then, the output unit 220 generates output data and transmits the generated output data to the clerk terminal 30 (step S30). The output data include the customer serving desire information and face image that the output unit 220 acquired.

Then, the display processing unit 320 of the clerk terminal 30 causes the display 310 to display the customer serving desire information and face image acquired from the customer service assistance apparatus 20.

Note that a process after step S30 may be executed at a freely selected timing. In one example, the process illustrated in step S30 may be repeatedly executed at regular time intervals. In this case, the output unit 220 reads out all customer serving desire information and face images that the information storage unit 250 stores.

Figure 9:
FIG. 9 It is a view illustrating an example of an image displayed on a display after step S30 in FIG. 8.

FIG. 9 is a view illustrating an example of an image displayed on the display 310 after step S30 in FIG. 8. In the example illustrated in the present Figure, the display 310 displays customer serving desire information by correlating the customer serving desire information with face image. Specifically, the display 310 displays customer serving desire information indicating that customer serving is desired, and face images related to this customer serving desire information, and customer serving desire information indicating that customer serving is not desired, and a face image related to this customer serving desire information. By viewing the information displayed on the display 310, the clerk can confirm the face of a customer desiring customer serving.

Figure 10:
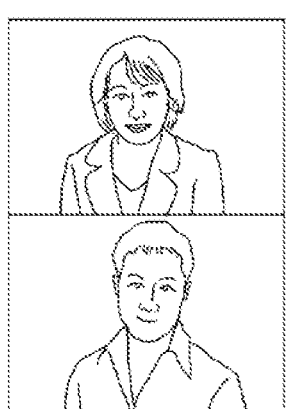
FIG. 10 It is a view illustrating a modification of FIG. 9.

FIG. 10 is a view illustrating a modification of FIG. 9. In the example illustrated in this Figure, the display processing unit 320 displays only the face images of customers, in connection with which the customer serving desire information indicates that customer serving is desired. In the example illustrated in the Figure, the display processing unit 320 does not cause the display 310 to display customer serving desire information, or a face image of a customer, in connection with which the customer serving desire information indicates that customer serving is not desired. Also, by doing so, the clerk can confirm the face of a customer desiring customer serving.

Figure 11:
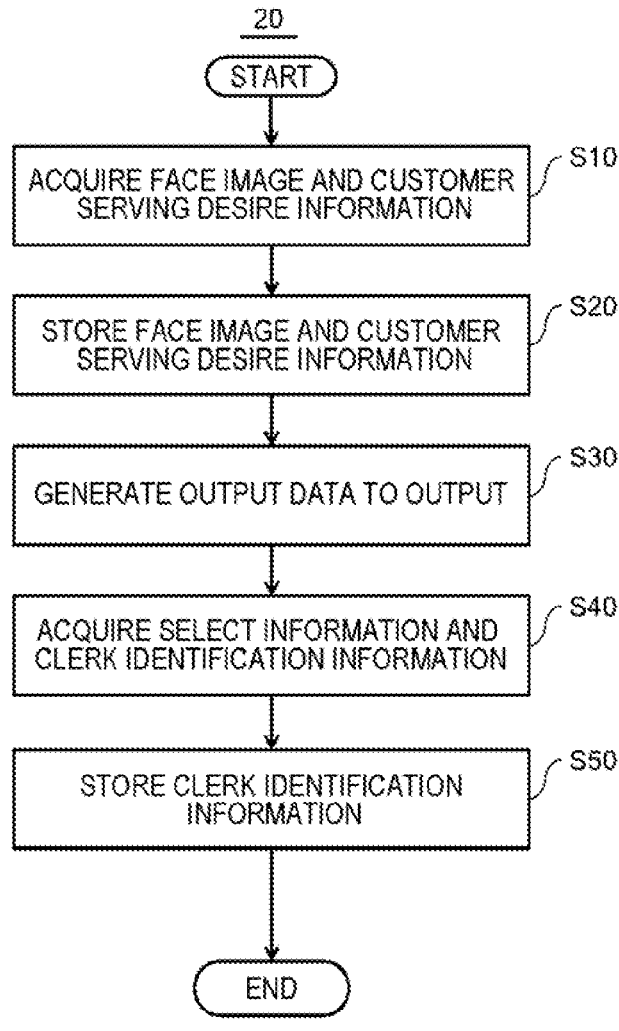
FIG. 11 It is a flowchart illustrating a second example of the process that the customer serving assistance apparatus executes.

FIG. 11 is a flowchart illustrating a second example of the process that the customer serving assistance apparatus 20 executes. In the example illustrated in this Figure, the processes illustrated in step S10 to step S30 are as described with reference to FIG. 8.

A clerk selects a customer that the clerk is to attend to, and inputs the selection result to the clerk terminal 30. Then, the clerk terminal 30 transmits information indicating that the clerk selected the customer, i.e., the above-described select information, to the customer serving assistance apparatus 20 together with the clerk identification information of the clerk. As described with reference to FIG. 1, the select information includes the customer determination information of the selected customer.

Note that there is a case where, at a timing of acquiring customer serving desire information from the store terminal 10, the customer serving assistance apparatus 20 gives an ID to the customer. In this case, the storage processing unit 230 causes the information storage unit 250 to store the ID. Further, the output unit 220 may include the ID in the output data. By doing so, the select information can include the ID as customer determination information.

The second acquisition unit 240 of the customer serving assistance apparatus 20 acquires the select information and the clerk identification information (step S40). The storage processing unit 230 causes the information storage unit 250 to store the clerk identification information acquired in step S40, associated with the customer determination information included in the select information (step S50).

As described above, according to the present example embodiment, the customer serving assistance apparatus 20 transmits the face image and the customer serving information to the clerk terminal 30. The display 310 of the clerk terminal 30 displays the face image and customer serving information. Accordingly, the clerk can easily identify a customer desiring customer serving, by viewing the display 310.

Note that in the present embodiment, the store terminal 10 may acquire a purpose of visiting a store, instead of the customer serving desire information. In this case, using the input purpose of visiting the store, the first acquisition unit 210 may determine whether it is necessary to attend to the customer. The customer serving assistance apparatus 20 treats this determination result as the customer serving desire information.

Second Example Embodiment

A customer serving assistance apparatus 20 according to the present example embodiment is similar to the customer serving assistance apparatus 20 according to the first example embodiment, except for the following points. First, the customer serving assistance apparatus 20 stores a visit time of a customer visiting a store. Furthermore, the customer serving assistance apparatus 20 sets a priority of customer serving for the customer, by using an elapsed time from the visit to the store.

FIG. 12 is a diagram illustrating an example of information that the information storage unit 250 stores in the present example embodiment. In the present example embodiment, the first acquisition unit 210 acquires, from the store terminal 10, a time at which the store terminal 10 acquired customer serving desire information. This time is treated as a visit time. Then, the storage processing unit 230 causes the information storage unit 250 to also store the visit time associated with the customer determination information.

Figure 13:
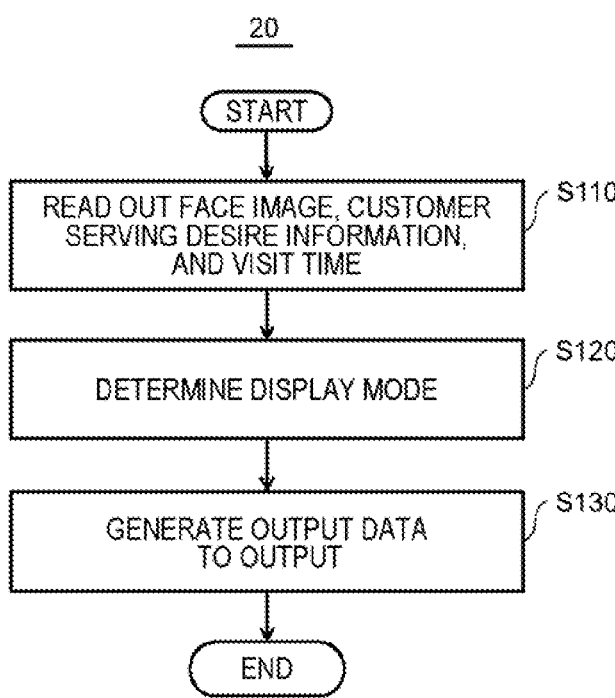
FIG. 13 It is a diagram illustrating an example of a process that a customer serving assistance apparatus executes in the second example embodiment.

FIG. 13 is a diagram illustrating an example of a process that the customer serving assistance apparatus 20 executes in the present example embodiment. In addition to a similar process to the first example embodiment, the customer serving assistance apparatus 20 according to the present example embodiment executes a process illustrated in this Figure. Although the process of this Figure is executed, for example, when the information storage unit 250 is updated, the process may be repeatedly executed at regular time intervals.

Firstly, the output unit 220 of the customer serving assistance apparatus 20 reads out the face image, customer serving desire information, presence/absence of the clerk in charge, and visit time, from the information storage unit 250 in regard to each of customers (step S110). Then, using the read-out information, the output unit 220 determines a display mode of output data on the display 310 of the clerk terminal 30, and generates output data such that the output data has this display mode (step S120).

For example, in regard to a customer who desires customer serving but for whom a clerk in charge of customer serving is not yet determined, the output unit 220 calculates an elapsed time from the visit to the store to the present. The output unit 220 calculates the elapsed time by using the visit time that is read out from the information storage unit 250. Then, the output unit 220 determines the display mode of at least one of the face image and the customer serving desire information of the customer, by using the elapsed time. For example, the output unit 220 emphasis-displays a face image of a customer with an elapsed time exceeding a reference value. At this time, as the reference time becomes longer, the output unit 220 may increase the degree of emphasis. Besides, when there are a plurality of customers for whom clerks in charge of customer serving are not yet determined, the output unit 220 may execute emphasis-display only for the customer with a longest elapsed time.

Then, the output unit 220 transmits the generated output data to the clerk terminal 30 (step S130). The display processing unit 320 of the clerk terminal 30 causes the display 310 to display the output data acquired from the customer serving assistance apparatus 20.

Figure 14:
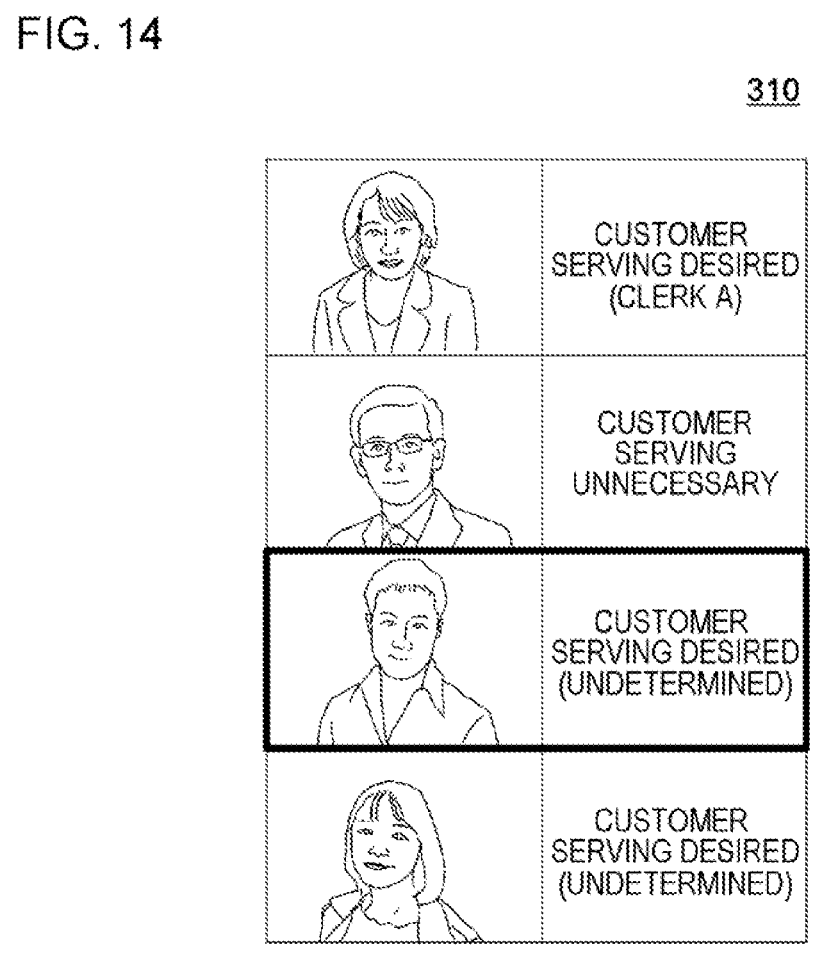

FIG. 14 is a view illustrating an example of a screen displayed on the display 310 after step S130. In the example illustrated in this Figure, there is one customer with an elapsed time exceeding the reference value. The frame of the face image of this one customer is emphasized together with the customer serving desire information.

Like the first example embodiment, according to the present example embodiment, a clerk can easily identify a customer desiring to be served. In addition, the clerk can easily recognize the face image of a customer with a high necessity for customer serving.

Third Example Embodiment

Figure 15:
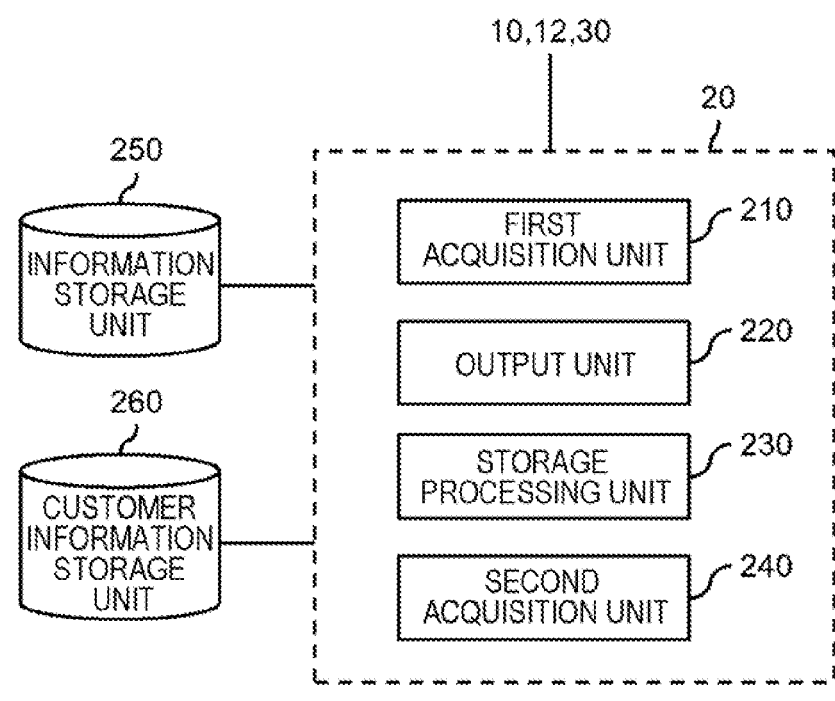
FIG. 15 It is a diagram illustrating an example of a functional configuration of a customer serving assistance apparatus according to a third example embodiment.

FIG. 15 is a diagram illustrating an example of a functional configuration of a customer serving assistance apparatus 20 according to the present example embodiment. The customer serving assistance apparatus 20 according to the present example embodiment is similar to the customer serving assistance apparatus 20 according to any one of the above-described example embodiments, except that the customer serving assistance apparatus 20 can utilize information that a customer information storage unit 260 stores.

The customer information storage unit 260 stores detailed information of a customer. Using the detailed information, the output unit 220 determines the display mode of output data on the display 310 of the clerk terminal 30. A concrete example of the method of determination is described later. The customer information storage unit 260 may be a part of the customer serving assistance apparatus 20, or may be provided outside the customer serving assistance apparatus 20.

In addition, the customer information storage unit 260 stores, in association with each piece of the customer identification information described with reference to FIG. 1, the face image of a customer related to the customer identification information. When the output unit 220 acquires customer identification information from the store terminal 10 instead of a face image, the output unit 220 includes in the output data the face image that the customer information storage unit 260 stores.

FIG. 16 is a diagram illustrating an example of information that the customer information storage unit 260 stores. In the example illustrated in this Figure, the customer information storage unit 260 stores, in association with each of customers, customer identification information, a face image of the customer, and detailed information of the customer. The detailed information includes, for example, attribute information such as a gender, and a purchase history of the customer in the store (including a related store in some cases). Note that the attribute information may further include an age group or the like.

Figure 17:
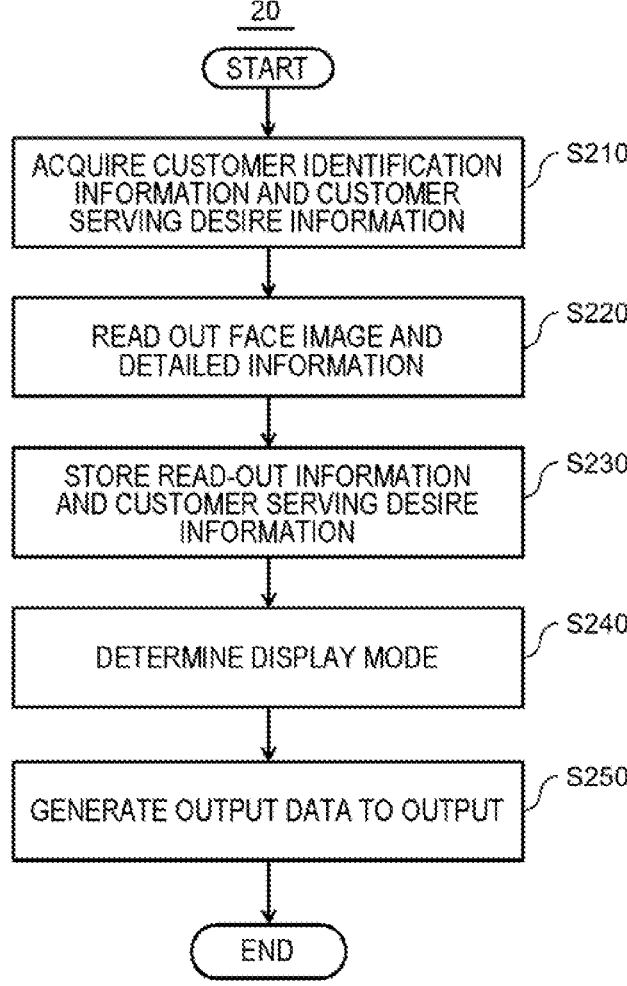
FIG. 17 It is a flowchart illustrating an example of a process that the customer serving assistance apparatus according to the third example embodiment executes.

FIG. 17 is a flowchart illustrating an example of a process that the customer serving assistance apparatus 20 according to the present example embodiment executes.

To begin with, a customer inputs customer identification information and customer serving desire information to the store terminal 10. Then, the store terminal 10 transmits the customer identification information and customer serving desire information to the customer serving assistance apparatus 20. At this time, the store terminal 10 does not transmit the face image of the customer to the customer serving assistance apparatus 20.

The first acquisition unit 210 of the customer serving assistance apparatus 20 acquires the customer identification information and customer serving desire information from the store terminal 10 (step S210), and reads out the face image and detailed information related to the acquired customer identification information from the customer information storage unit 260 (step S220). The storage processing unit 230 causes the information storage unit 250 to store the customer serving desire information acquired in step S210 associated with the face image and detailed information read out in step S220 (step S230).

Then, the output unit 220 reads out the face image, customer serving necessary/unnecessary information, and detailed information stored in the information storage unit 250, and generates output data by using the read-out information (step S240). At this time, the output unit 220 determines the display mode of the face image of a customer, in connection with which the customer serving necessary/ unnecessary information indicates that the customer desires customer serving, by using the detailed information of the customer (step S240). For example, the output unit 220 calculates at least one of a purchase total amount and the number of purchased items by using the purchase history of the customer, and, when the calculated value exceeds a reference, the output unit 220 emphasis-displays the frame of the face image of the customer. Then, the output unit 220 generates output data in accordance with the display mode determined in step S240, and transmits the output data to the clerk terminal 30 (step S250).

The display processing unit 320 of the clerk terminal 30 causes the display 310 to display the output data acquired from the customer serving assistance apparatus 20. By confirming the information displayed on the display 310, the clerk can recognize a customer that is to be served intensively.

Note that in step S250, the output unit 220 may include in the output data at least part of the detailed information of the customer, for example, the purchase history. By doing so, the clerk can perform customer serving along the orientation of the customer, by confirming the information displayed on the display 310.

In addition, when the customer information storage unit 260 stores a visit history of a customer, the customer serving assistance apparatus 20 may use the visit history instead of the purchase history. In this case, the output unit 220 determines whether to execute emphasis display, and determines the degree of emphasis, by using the number of times of visiting to the store. For example, the number of times of visiting to the store exceeds a reference value, the output unit 220 may emphasis-display the frame of the face image of the customer.

Besides, in this case, the visit history may include a matter to be passed to a successor, by a clerk that attended to the customer at that time. In this case, the output unit 220 may generate display data by further using the matter to be passed to a successor. In one example, the output unit 220 may include in the display data the matter to be passed to a successor, or may include in the display data a mark related to the content of the matter to be passed to a successor (for example, the occurrence of a trouble at a time of a visit in the past).

As described above, according to the present example embodiment, too, a clerk can easily identify a customer desiring to be served. In addition, the clerk can easily recognize the face image of a customer that is to be served intensively.

Fourth Example Embodiment

Figure 18:
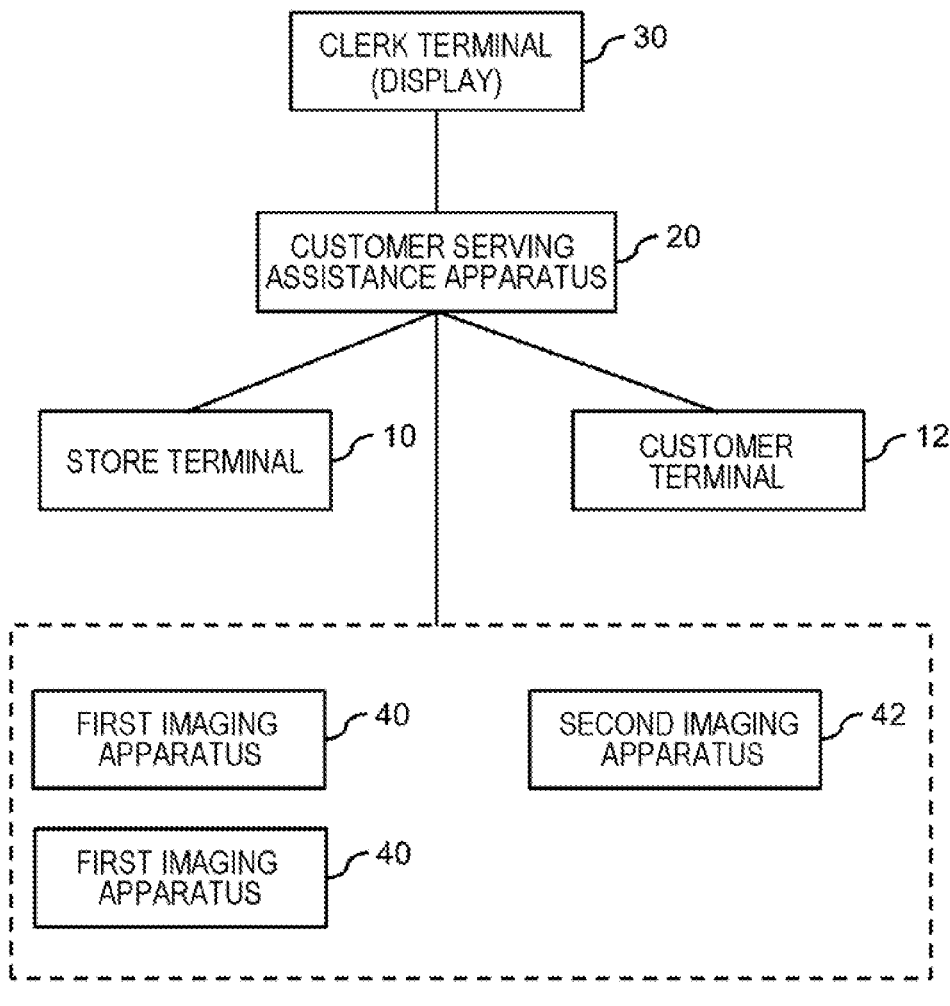
FIG. 18 It is a diagram for describing an environment of use of a customer serving assistance apparatus according to a fourth example embodiment.

FIG. 18 is a diagram for describing an environment of use of the customer serving assistance apparatus 20 according to the present example embodiment. The customer serving assistance apparatus 20 according to the present example embodiment is used together with at least one first imaging apparatus 40, and a second imaging apparatus 42, in addition to the example of each of the above-described example embodiments.

The first imaging apparatus 40 photographs the inside of a store, and transmits the generated image to the customer serving assistance apparatus 20. The second imaging apparatus 42 photographs an exit of the store, and transmits the generated image to the customer serving assistance apparatus 20. Then, the customer serving assistance apparatus 20 determines a customer that left the store, by using at least one of the image acquired from the first imaging apparatus 40 and the image acquired from the second imaging apparatus 42. Further, the customer serving assistance apparatus 20 executes a process for excluding, from the output data, the information (for example, the face image and customer serving desire information) relating to the customer that left the store.

By processing the image acquired from the first imaging apparatus 40, the customer serving assistance apparatus 20 detects a customer that performed a predetermined gesture (for example, continuously raising a hand for a predetermined time). Then, the customer serving assistance apparatus 20 determines that the detected customer desires to be served, and causes the information storage unit 250 to store customer serving desire information to this effect.

Figure 19:
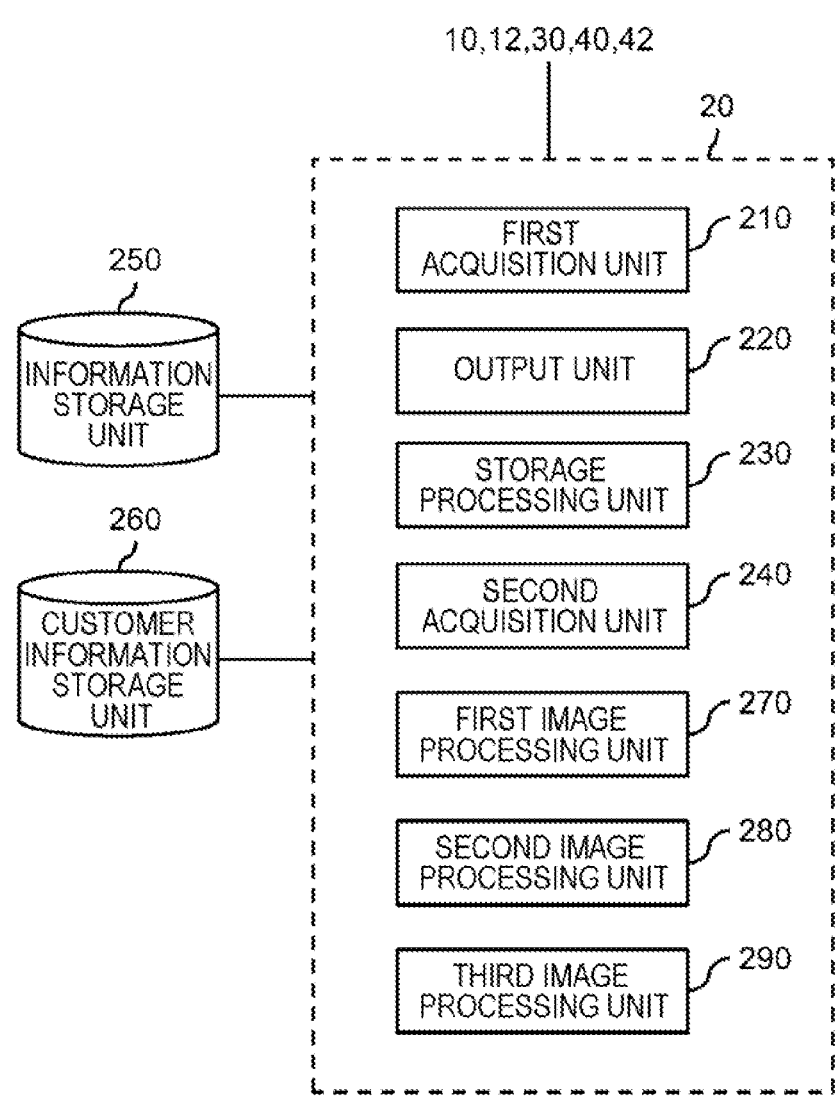
FIG. 19 It is a diagram illustrating an example of a functional configuration of the customer serving assistance apparatus according to the fourth example embodiment.

FIG. 19 is a diagram illustrating an example of a functional configuration of the customer serving assistance apparatus 20 according to the present example embodiment. The customer serving assistance apparatus 20 illustrated in this Figure has a similar configuration to the customer serving assistance apparatus 20 illustrated in FIG. 15, except that the customer serving assistance apparatus 20 includes a first image processing unit 270, a second image processing unit 280, and a third image processing unit 290.

The first image processing unit 270 determines a customer that left the store, by using at least one of the image generated by the first imaging apparatus 40 and the image generated by the second imaging apparatus 42. For example, the first image processing unit 270 determines that a customer included in the image generated by the second imaging apparatus 42 is a customer that left the store. Further, the first image processing unit 270 determines that a customer, who is not included continuously for a predetermined time in the image generated by any one of the first imaging apparatuses 40, is a customer that left the store.

In regard to the customer that left the store, the storage processing unit 230 causes the information storage unit 250 to store information to this effect (hereinafter referred to as "exit information"). Note that the storage processing unit 230 may delete various information of the customer that left the store from the information storage unit 250.

The second image processing unit 280 detects a customer that performed a predetermined gesture, by processing the image generated by the first imaging apparatus 40. The gesture means that the customer desires to be served. Then, the second image processing unit 280 generates a face image of the customer that performed the gesture, by processing the image generated by the first imaging apparatus 40 (for example, trimming). Then, the first acquisition unit 210 acquires the face image together with the customer serving desire information indicating that customer serving is desired.

The storage processing unit 230 causes the information storage unit 250 to store the face image acquired from the second image processing unit 280 associated with the customer serving desire information. Using the information stored in the information storage unit 250, the output unit 220 generates output data and transmits the output data to the clerk terminal 30. The output data includes the face image of the customer detected by the second image processing unit 280.

Note that there is a case where a customer, at a time of visiting a store, inputs to the store terminal 10 customer serving desire information indicating that customer serving is not desired, and then, on second thought, desires customer serving in the store. In this case, the customer may perform the above-described gesture in the store.

In this case, the information storage unit 250 already stores the face image corresponding to the face image generated by the second image processing unit 280, and the customer serving desire information related to the face image. This customer serving desire information indicates that customer serving is not desired. Thus, the storage processing unit 230 changes the customer serving desire information stored in the information storage unit 250, to customer serving desire information indicating that customer serving is desired. Thereafter, the output unit 220 newly generates output data including the changed customer serving desire information, and transmits the output data to the clerk terminal 30.

The third image processing unit 290 repeatedly determines the present position of a customer in the store, by processing the image generated by the first imaging apparatus 40. In this determination, the face image stored in the information storage unit 250 may be used. In this case, the third image processing unit 290 executes matching between the image acquired by the first imaging apparatus 40 and the face image stored in the information storage unit 250, thereby determining the present position of the customer related to the face image. Then, the storage processing unit 230 causes the information storage unit 250 to store the present position.

Then, the output unit 220 includes, in the output data, the present position of the customer, in connection with which the customer serving desire information indicates that customer serving is desired. By doing so, the present position of the customer is displayed on the display 310 of the clerk terminal 30. Note that the present position may be displayed, for example, on a floor map.

FIG. 20 is a diagram illustrating an example of information that the information storage unit 250 stores in the present example embodiment. In the example illustrated in this Figure, the information storage unit 250 stores, in addition to the information illustrated in FIG. 12, the above-described exit information in connection with a customer that left the store, and the present position of a customer that has not yet left the store.

Figure 21:
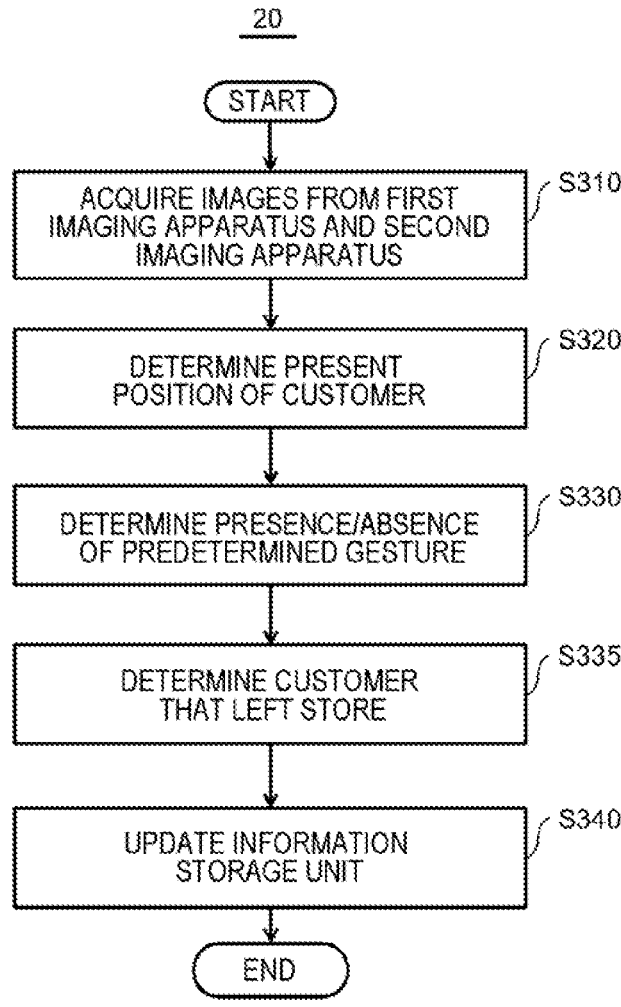
FIG. 21 It is a flowchart illustrating a first example of a process that the customer serving assistance apparatus according to the fourth example embodiment executes.

FIG. 21 illustrates a first example of a process that the customer serving assistance apparatus 20 according to the present example embodiment executes. The process illustrated in this Figure is a process relating to the image generated by the first imaging apparatus 40 and the image generated by the second imaging apparatus 42. The first imaging apparatus 40 and second imaging apparatus 42 generate images at a predetermined frame rate (for example, a frame rate between 1 frame/sec and 5 frames/sec, although not limited to this value), and transmit the generated images to the customer serving assistance apparatus 20 in real time. Each time images are transmitted from the first imaging apparatus 40 and second imaging apparatus 42, the customer serving assistance apparatus 20 executes the process illustrated in this Figure.

Firstly, the customer serving assistance apparatus 20 acquires images from the first imaging apparatus 40 and second imaging apparatus 42 (step S310).

The third image processing unit 290 determines the present position of each customer by processing the images generated by the first imaging apparatus 40 (step S320). An example of the process executed here is as described with reference to FIG. 19.

In addition, the second image processing unit 280 determines the presence or absence of a customer that performed a predetermined gesture, by processing the image generated by the first imaging apparatus 40. In a case where a customer that performed the gesture is present, the second image processing unit 280 generates a face image of the customer that performed the gesture. Then, the first acquisition unit 210 acquires this face image together with the customer serving desire information indicating that customer serving is desired (step S330). An example of the process executed here is as described with reference to FIG. 19.

In addition, the first image processing unit 270 determines a customer that left the store, by processing the image generated by the first imaging apparatus 40 and the image generated by the second imaging apparatus 42 (step S335). An example of the process executed here is as described with reference to FIG. 19.

Then, the storage processing unit 230 updates the information storage unit 250 by using the information generated in step S320 to step S340 (step S340). An example of the process executed here is as described with reference to FIG. 19.

Figure 22:
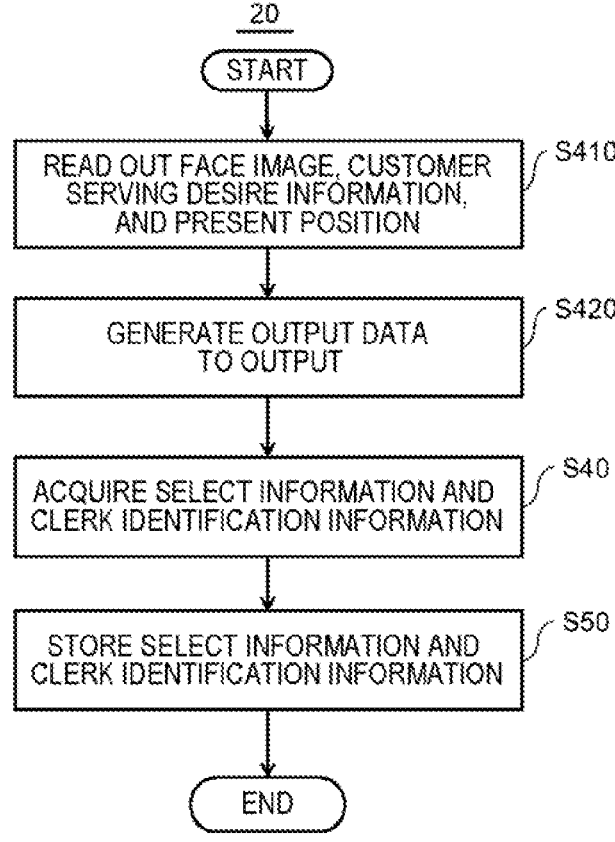
FIG. 22 It is a flowchart illustrating a second example of the process that the customer serving assistance apparatus according to the fourth example embodiment executes.

FIG. 22 illustrates a second example of the process that the customer serving assistance apparatus 20 according to the present example embodiment executes. This Figure illustrates a process of transmitting output data to the clerk terminal 30, and the process is repeatedly executed, for example, at regular time intervals. Note that, aside from the process illustrated in the present Figure, the process illustrated in step S10 and step S20 of FIG. 8 and the process illustrated in FIG. 21 are also executed. Thus, the latest data are stored in the information storage unit 250.

Firstly, the output unit 220 reads out, from the information storage unit 250, the information (for example, the face image, customer serving desire information and present position) necessary for generating output data (step S410). Then, the output unit 220 generates the output data by using the read-out data, and transmits the output data to the clerk terminal 30 (step S420). The output data includes the face image, customer serving desire information and present position. Then, the display processing unit 320 of the clerk terminal 30 causes the display 310 to correlate and display the face image, customer serving desire information and present position with each other. Thus, the clerk can easily recognize the present position of the customer desiring to be served.

The subsequence process (step S40 and step S50) is as described with reference to FIG. 11. Note that after step S50, in a case where the present position of the customer indicated by the select information (i.e., the customer to be served by the clerk) is updated, the output unit 220 may transmit the updated present position to the clerk terminal 30.

According to the present example embodiment, too, a clerk can easily identify a customer desiring to be served. Furthermore, the clerk can easily recognize the present position of the customer desiring to be served.

The example embodiments of the present invention have been described above with reference to the drawings, but these example embodiments are exemplary illustrations of the present invention, and various configurations other than the above can be adopted.

In addition, in the flowcharts used in the above description, a plurality of steps (processes) are described in order, but the order of execution of the steps executed in each example embodiment is not limited to the order described. In each example embodiment, the order of the illustrated steps can be changed within such a range that no problem occurs in contents. Besides, the above-described example embodiments can be combined within such a range that no contradiction occurs in contents.

A part or the entirety of the above-described example embodiments can be described as in the following supplementary notes, but is not limited to the following.

1. A customer serving assistance apparatus including:
   a first acquisition unit that acquires customer determination information that determines a customer entering a store, and customer serving desire information indicating whether the customer desires to be served; and
   an output unit that determines, in regard to at least the customer serving desire information indicating that customer serving is desired, the customer determination information related to the customer serving desire information, determines a face image of the customer related to the customer determination information, and outputs output data including the face image.

2. The customer serving assistance apparatus according to supplementary note 1, wherein
   the output unit includes, in the output data, the customer serving desire information indicating that customer serving is desired and the face image related to the customer serving desire information, and the customer serving desire information indicating that customer serving is not desired and a face image related to the customer serving desire information.

3. The customer serving assistance apparatus according to supplementary note 1 or 2, wherein
   the customer determination information is the face image.

4. The customer serving assistance apparatus according to supplementary note 1 or 2, wherein
   the output unit determines the face image to be output, by using a storage unit that stores the customer determination information and the face image associated with each other.

5. The customer serving assistance apparatus according to any one of supplementary notes 1 to 4, wherein
   the first acquisition unit acquires the customer determination information and the customer serving desire information from a store terminal installed in the store or at an entrance of the store, or from a customer terminal that the customer carries.

6. The customer serving assistance apparatus according to any one of supplementary notes 1 to 5, further including a first image processing unit that determines the customer that left the store, by using at least one of an image that a first imaging apparatus installed in the store generates, and an image that a second imaging apparatus installed at an exit of the store generates,
   wherein the output unit excludes, from the output data, the face image of the customer determined to have left the store by the first image processing unit.

7. The customer serving assistance apparatus according to supplementary note 6, wherein
   the first image processing unit determines that the customer, who is not included continuously for a predetermined time in the image generated by the first imaging apparatus, is the customer that left the store.

8. The customer serving assistance apparatus according to any one of supplementary notes 1 to 7, wherein
   the output unit causes a display, which is visually recognizable by a clerk of the store, to display the output data.

9. The customer serving assistance apparatus according to supplementary note 8, wherein the output unit
   acquires, from customer information storage unit storing detailed information of the customer in regard to each of a plurality of the customers, the detailed information related to the customer determination information, and
   determines a display mode of the output data on the display, by using the detailed information.

10. The customer serving assistance apparatus according to any one of supplementary notes 1 to 9, further including:
   a storage processing unit that causes a storage unit to store the customer determination information and the customer serving desire information associated with each other; and
   a second acquisition unit that acquires select information indicating the customer selected by a clerk,
   wherein the storage processing unit causes the storage unit to further store clerk-in-charge information indicating that a clerk in charge of customer serving of the customer indicated by the select information is determined.

11. The customer serving assistance apparatus according to supplementary note 10, wherein the second acquisition unit acquires clerk identification information of the clerk that selected the customer, together with the select information, and the storage processing unit causes the storage unit to store the clerk identification information acquired by the second acquisition unit, as at least part of the clerk-in-charge information.

12. The customer serving assistance apparatus according to any one of supplementary notes 1 to 11, wherein the output unit determines a display mode of the output data by using an elapsed time from when the customer enters the store to a present.

13. The customer serving assistance apparatus according to any one of supplementary notes 1 to 12, further including a second image processing unit that detects that the customer performed a specific gesture, by using an image generated by a first imaging apparatus installed in the store, and determines the customer determination information of the customer, wherein the first acquisition unit acquires the customer determination information from the second image processing unit, and sets the customer serving desire information related to the customer determination information such that customer serving is desired.

14. The customer serving assistance apparatus according to any one of supplementary notes 1 to 13, further including a third image processing unit that determines a present position of the customer by processing an image captured by photographing the store, wherein the output unit includes, in the output data, the present position of the customer in connection with which the customer serving desire information indicates that customer serving is desired.

15. A customer serving assistance method in which a computer executes:

a first acquisition process of acquiring customer determination information that determines a customer entering a store, and customer serving desire information indicating whether the customer desires to be served; and an output process of determining, in regard to at least the customer serving desire information indicating that customer serving is desired, the customer determination information related to the customer serving desire information, determining a face image of the customer related to the customer determination information, and outputting output data including the face image.

16. The customer serving assistance method according to supplementary note 15, wherein the computer, in the output process, includes, in the output data, the customer serving desire information indicating that customer serving is desired and the face image related to the customer serving desire information, and the customer serving desire information indicating that customer serving is not desired and a face image related to the customer serving desire information.

17. The customer serving assistance method according to supplementary note 15 or 16, wherein the customer determination information is the face image.

18. The customer serving assistance method according to supplementary note 15 or 16, wherein the computer, in the output process, determines the face image to be output, by using a storage unit that stores the customer determination information and the face image associated with each other.

19. The customer serving assistance method according to any one of supplementary notes 15 to 18, wherein the computer, in the first acquisition process, acquires the customer determination information and the customer serving desire information from a store terminal installed in the store or at an entrance of the store, or from a customer terminal that the customer carries.

20. The customer serving assistance method according to any one of supplementary notes 15 to 19, wherein the computer further executes a first image process of determining the customer that left the store, by using at least one of an image that a first imaging apparatus installed in the store generates, and an image that a second imaging apparatus installed at an exit of the store generates, and in the output process, excludes, from the output data, a face image of the customer determined to have left the store by the first image process.

21. The customer serving assistance method according to supplementary note 20, wherein the computer, in the first image process, determines that the customer, who is not included continuously for a predetermined time in the image generated by the first imaging apparatus, is the customer that left the store.

22. The customer serving assistance method according to any one of supplementary notes 15 to 21, wherein the computer, in the output process, causes a display, which is visually recognizable by a clerk of the store, to display the output data.

23. The customer serving assistance method according to supplementary note 22, wherein the computer, in the output process, acquires, from a customer information storage unit that stores detailed information of the customer in regard to each of a plurality of the customers, the detailed information related to the customer determination information, and determines a display mode of the output data on the display, by using the detailed information.

24. The customer serving assistance method according to any one of supplementary notes 15 to 23, wherein the computer further executes:

a storage process of causing storage unit to store the customer determination information and the customer serving desire information associated with each other; and a second acquisition process of acquiring select information indicating the customer selected by a clerk, and in the storage process, causes the storage unit to further store clerk-in-charge information indicating that a clerk in charge of customer serving of the customer indicated by the select information is determined.

25. The customer serving assistance method according to supplementary note 24, wherein the computer in the second acquisition process, acquires clerk identification information of the clerk that selected the customer, together with the select information, and in the storage process, causes the storage unit to store the clerk identification information acquired in the second acquisition process, as at least part of the clerk-in-charge information.

26. The customer serving assistance method according to any one of supplementary notes 15 to 25, wherein the computer in the output process, determines a display mode of the output data by using an elapsed time from when the customer enters the store to a present.

27. The customer serving assistance method according to any one of supplementary notes 15 to 26, wherein the computer further executes a second image process of detecting that the customer performed a specific gesture, by using an image generated by a first imaging apparatus installed in the store, and determining the customer determination information of the customer, and in the first acquisition process, acquires the customer determination information determined in the second image process, and sets the customer serving desire information related to the customer determination information such that customer serving is desired.

28. The customer serving assistance method according to any one of supplementary notes 15 to 27, wherein the computer further executes a third image process of determining a present position of the customer by processing an image captured by photographing the store, and in the output process, includes, in the output data, the present position of the customer in connection with which the customer serving desire information indicates that customer serving is desired.

29. A program causing a computer to include:

a first acquisition function of acquiring customer determination information that determines a customer entering a store, and customer serving desire information indicating whether the customer desires to be served; and an output function of determining, in regard to at least the customer serving desire information indicating that customer serving is desired, the customer determination information related to the customer serving desire information, determining a face image of the customer related to the customer determination information, and outputting output data including the face image.

30. The program according to supplementary note 29, wherein the output function includes, in the output data, the customer serving desire information indicating that customer serving is desired and the face image related to the customer serving desire information, and the customer serving desire information indicating that customer serving is not desired and a face image related to the customer serving desire information.

31. The program according to supplementary note 29 or 30, wherein the customer determination information is the face image.

32. The program according to supplementary note 29 or 30, wherein the output function determines the face image to be output, by using a storage unit that stores the customer determination information and the face image associated with each other.

33. The program according to any one of supplementary notes 29 to 32, wherein the first acquisition function acquires the customer determination information and the customer serving desire information from a store terminal installed in the store or at an entrance of the store, or from a customer terminal that the customer carries.

34. The program according to any one of supplementary notes 29 to 33, further causing the computer to include a first image processing function of determining the customer that left the store, by using at least one of an image that a first imaging apparatus installed in the store generates, and an image that a second imaging apparatus installed at an exit of the store generates, wherein the output function excludes, from the output data, a face image of the customer determined to have left the store by the first image processing function.

35. The program according to supplementary note 34, wherein the first image processing function determines that the customer, who is not included continuously for a predetermined time in the image generated by the first imaging apparatus, is the customer that left the store.

36. The program according to any one of supplementary notes 29 to 35, wherein the output function causes a display, which is visually recognizable by a clerk of the store, to display the output data.

37. The program according to supplementary note 36, wherein the output function acquires, from a customer information storage unit that stores detailed information of the customer in regard to each of a plurality of the customers, the detailed information related to the customer determination information, and determines a display mode of the output data on the display, by using the detailed information.

38. The program according to any one of supplementary notes 29 to 37, further causing the computer to include:

a storage processing function of causing storage unit to store the customer determination information and the customer serving desire information associated with each other; and a second acquisition function of acquiring select information indicating the customer selected by a clerk, wherein the storage processing function causes the storage unit to further store clerk-in-charge information indicating that a clerk in charge of customer serving of the customer indicated by the select information is determined.

39. The program according to supplementary note 38, wherein the second acquisition function acquires clerk identification information of the clerk that selected the customer, together with the select information, and the storage processing function causes the storage unit to store the clerk identification information acquired by the second acquisition function, as at least part of the clerk-in-charge information.

40. The program according to any one of supplementary notes 29 to 39, wherein the output function determines a display mode of the output data by using an elapsed time from when the customer enters the store to a present.

41. The program according to any one of supplementary notes 29 to 40, further causing the computer to include a second image processing function of detecting that the customer performed a specific gesture, by using an image generated by a first imaging apparatus installed in the store, and determining the customer determination information of the customer, wherein the first acquisition function acquires the customer determination information determined by the second image processing function, and sets the customer serving desire information related to the customer determination information such that customer serving is desired.

42. The program according to any one of supplementary notes 29 to 41, further causing the computer to include an image processing function of determining a present position of the customer by processing an image captured by photographing the store, wherein the output function includes, in the output data, the present position of the customer in connection with which the customer serving desire information indicates that customer serving is desired.

REFERENCE SIGNS LIST

10 Store terminal
12 Customer terminal
20 Customer servicing assistance apparatus
30 Clerk terminal
40 First imaging apparatus
42 Second imaging apparatus
110 Input unit
120 Imaging unit
130 Communication unit
210 First acquisition unit
220 Output unit
230 Storage processing unit
240 Second acquisition unit
250 Information storage unit
260 Customer information storage unit
270 First image processing unit
280 Second image processing unit
290 Third image processing unit
310 Display
320 Display processing unit
330 Input unit
340 Communication unit

What is claimed is:

1. A customer serving assistance apparatus comprising:
at least one memory configured to store instructions; and
at least one processor configured to execute the instructions to:
acquire, from a store terminal, when a customer enters a store, customer determination information that determines the customer who entered the store, and customer serving desire information that is inputted to the store terminal by the customer, in association with each other, the customer serving desire information indicating whether the customer desires to be served, the store terminal being installed at least one of in the store and at an entrance of the store, the store terminal comprising a capturing unit that generates a face image of the customer, the customer determination information being the face image of the customer;
determine, during a time that the customer stays in the store after the customer entered the store, in regard to at least the customer serving desire information indicating that customer serving is desired, the customer determination information related to the customer serving desire information;
determine a face image of the customer related to the customer determination information;
display output data including the face image on a display of a clerk terminal that a clerk operates;
acquire, from the store terminal, when the customer enters the store, a purpose of visiting the store of the customer that the customer entered into the store terminal; and
determine whether or not it is necessary to attend to the customer using the acquired purpose of visiting the store of the customer to acquire a result of determination as the customer serving desire information;
detect that the customer performed a specific gesture, by using an image generated by a first imaging apparatus installed in the store, and determines the customer determination information of the customer;
acquire the customer determination information from the second image processing unit, and set the customer serving desire information related to the customer determination information such that customer serving is desired;
determine a present position of the customer by processing an image captured by photographing the store; and
include, in the output data, the present position of the customer in connection with which the customer serving desire information indicates that customer serving is desired.

2. The customer serving assistance apparatus according to claim 1, wherein the at least one processor is further configured to execute the instructions to determine a face image of the customer related to the customer determination information indicating that customer serving is not desired, and include, in the output data, the customer serving desire information indicating that customer serving is desired and the face image related to the customer serving desire information, and the customer serving desire information indicating that customer serving is not desired and the face image related to the customer serving desire information.

3. The customer serving assistance apparatus according to claim 1, wherein the customer determination information is the face image.

4. The customer serving assistance apparatus according to claim 1, wherein the at least one processor is further configured to execute the instructions to determine the face image to be output, by using a storage unit that stores the customer determination information and the face image associated with each other.

5. The customer serving assistance apparatus according to claim 1, wherein the at least one processor is further configured to execute the instructions to acquire the customer determination information and the customer serving desire information from a store terminal installed in the store or at an entrance of the store, or from a customer terminal that the customer carries.

6. The customer serving assistance apparatus according to claim 1, wherein the at least one processor is further configured to execute the instructions to:
determine the customer that left the store, by using at least one of an image that a first imaging apparatus installed in the store generates, and an image that a second imaging apparatus installed at an exit of the store generates; and

exclude, from the output data, the face image of the customer determined to have left the store by the first image processing unit.

7. The customer serving assistance apparatus according to claim 6, wherein the at least one processor is further configured to execute the instructions to determine that the customer, who is not included continuously for a predetermined time in the image generated by the first imaging apparatus, is the customer that left the store.

8. The customer serving assistance apparatus according to claim 1, wherein the at least one processor is further configured to execute the instructions to cause a display, which is visually recognizable by a clerk of the store, to display the output data.

9. The customer serving assistance apparatus according to claim 8, wherein the at least one processor is further configured to execute the instructions to:
acquire, from a customer information storage unit that stores detailed information of the customer in regard to each of a plurality of the customers, the detailed information related to the customer determination information; and
determine a display mode of the output data on the display, by using the detailed information.

10. The customer serving assistance apparatus according to claim 1, wherein the at least one processor is further configured to execute the instructions to:
cause a storage unit to store the customer determination information and the customer serving desire information associated with each other;
acquire select information indicating the customer selected by a clerk; and
cause the storage unit to further store clerk-in-charge information indicating that a clerk in charge of customer serving of the customer indicated by the select information is determined.

11. The customer serving assistance apparatus according to claim 10, wherein the at least one processor is further configured to execute the instructions to:
acquire clerk identification information of the clerk that selected the customer, together with the select information; and
cause the storage unit to store the clerk identification information acquired by the second acquisition unit, as at least part of the clerk-in-charge information.

12. The customer serving assistance apparatus according to claim 1, wherein the at least one processor is further configured to execute the instructions to:
determine a display mode of the output data by using an elapsed time from when the customer enters the store to a present.

13. The customer serving assistance apparatus according to claim 1, wherein the at least one processor is further configured to execute the instructions to control the clerk terminal to notify the clerk of the result of the determination.

14. A customer serving assistance method performed by a computer, the customer serving assistance method comprising:
acquiring, from a store terminal, when a customer enters a store, customer determination information that determines the customer who entered the store, and customer serving desire information that is inputted to the store terminal by the customer, in association with each other, the customer serving desire information indicating whether the customer desires to be served, the store terminal being installed at least one of in the store and at an entrance of the store, the store terminal comprising a capturing unit that generates a face image of the customer, the customer determination information being the face image of the customer;
determining, during a time that the customer stays in the store after the customer entered the store, in regard to at least the customer serving desire information indicating that customer serving is desired, the customer determination information related to the customer serving desire information;
determining a face image of the customer related to the customer determination information;
displaying output data including the face image on a display of a clerk terminal that a clerk operates;
acquiring, from the store terminal, when the customer enters the store, a purpose of visiting the store of the customer that the customer entered into the store terminal;
determining whether or not it is necessary to attend to the customer using the acquired purpose of visiting the store of the customer to acquire a result of determination as the customer serving desire information;
detecting that the customer performed a specific gesture, by using an image generated by a first imaging apparatus installed in the store, and determining the customer determination information of the customer;
acquiring the customer determination information from the second image processing unit, and setting the customer serving desire information related to the customer determination information such that customer serving is desired;
determining a present position of the customer by processing an image captured by photographing the store; and
including, in the output data, the present position of the customer in connection with which the customer serving desire information indicates that customer serving is desired.

15. A non-transitory computer-readable storage medium storing a program causing a computer to execute:
acquiring, from a store terminal, when a customer enters a store, customer determination information that determines the customer who entered the store, and customer serving desire information that is inputted to the store terminal by the customer, in association with each other, the customer serving desire information indicating whether the customer desires to be served, the store terminal being installed at least one of in the store and at an entrance of the store, the store terminal comprising a capturing unit that generates a face image of the customer, the customer determination information being the face image of the customer;
determining, during a time that the customer stays in the store after the customer entered the store, in regard to at least the customer serving desire information indicating that customer serving is desired, the customer determination information related to the customer serving desire information;
determining a face image of the customer related to the customer determination information;
displaying output data including the face image on a display of a clerk terminal that a clerk operates;
acquiring, from the store terminal, when the customer enters the store, a purpose of visiting the store of the customer that the customer entered into the store terminal;
determining whether or not it is necessary to attend to the customer using the acquired purpose of visiting the store of the customer to acquire a result of determination as the customer serving desire information;

detecting that the customer performed a specific gesture, by using an image generated by a first imaging apparatus installed in the store, and determining the customer determination information of the customer;

acquiring the customer determination information from the second image processing unit, and setting the customer serving desire information related to the customer determination information such that customer serving is desired;

determining a present position of the customer by processing an image captured by photographing the store; and including, in the output data, the present position of the customer in connection with which the customer serving desire information indicates that customer serving is desired.

\* \* \* \* \*